(12) United States Patent
Jeon

(10) Patent No.: US 9,152,315 B2
(45) Date of Patent: Oct. 6, 2015

(54) METHOD AND APPARATUS FOR OPERATING AN ELECTRONIC BOOK FUNCTION IN A MOBILE DEVICE

(75) Inventor: Ki Cheol Jeon, Anyang-si (KR)

(73) Assignee: Samsung Electronics Co., Ltd (KR)

( * ) Notice: Subject to any disclaimer, the term of this patent is extended or adjusted under 35 U.S.C. 154(b) by 220 days.

(21) Appl. No.: 13/301,266

(22) Filed: Nov. 21, 2011

(65) Prior Publication Data

US 2012/0127104 A1    May 24, 2012

(30) Foreign Application Priority Data

Nov. 19, 2010    (KR) .................. 10-2010-0115448

(51) Int. Cl.
```
G06F 3/0483      (2013.01)
G06F 3/048       (2013.01)
G06F 3/0488      (2013.01)
G06F 15/02       (2006.01)
```

(52) U.S. Cl.
CPC .......... G06F 3/0488 (2013.01); G06F 15/0291 (2013.01)

(58) Field of Classification Search
CPC .... G06F 3/048; G06F 3/0483; G06F 3/04812
See application file for complete search history.

(56) References Cited

U.S. PATENT DOCUMENTS

| | | | |
|---|---|---|---|
| 6,683,631 B2 | 1/2004 | Carroll | |
| 6,891,551 B2 | 5/2005 | Keely et al. | |
| 7,620,915 B2 * | 11/2009 | Ludwig | 715/856 |
| 2007/0094619 A1 * | 4/2007 | Shirai | 715/860 |
| 2007/0157085 A1 * | 7/2007 | Peters | 715/531 |
| 2010/0064238 A1 * | 3/2010 | Ludwig | 715/770 |
| 2010/0235783 A1 * | 9/2010 | Ording et al. | 715/810 |
| 2011/0181528 A1 * | 7/2011 | Capela et al. | 345/173 |

* cited by examiner

*Primary Examiner* — Temesgh Ghebretinsae
*Assistant Examiner* — Paras D Karki
(74) *Attorney, Agent, or Firm* — The Farrell Law Firm, P.C.

(57) ABSTRACT

A touch device is provided that allows users to easily select text in an Electronic Book (e-book), based on a touch interaction. A method is also provided that operates an e-book function in the touch device which includes displaying e-book content, receiving an anchor interaction at a location in text of the e-book content, displaying a number of candidate anchors, based on the location where the anchor interaction is input, determining two selected candidate anchors as definite anchors, and forming a block of text in the definite anchors.

15 Claims, 5 Drawing Sheets

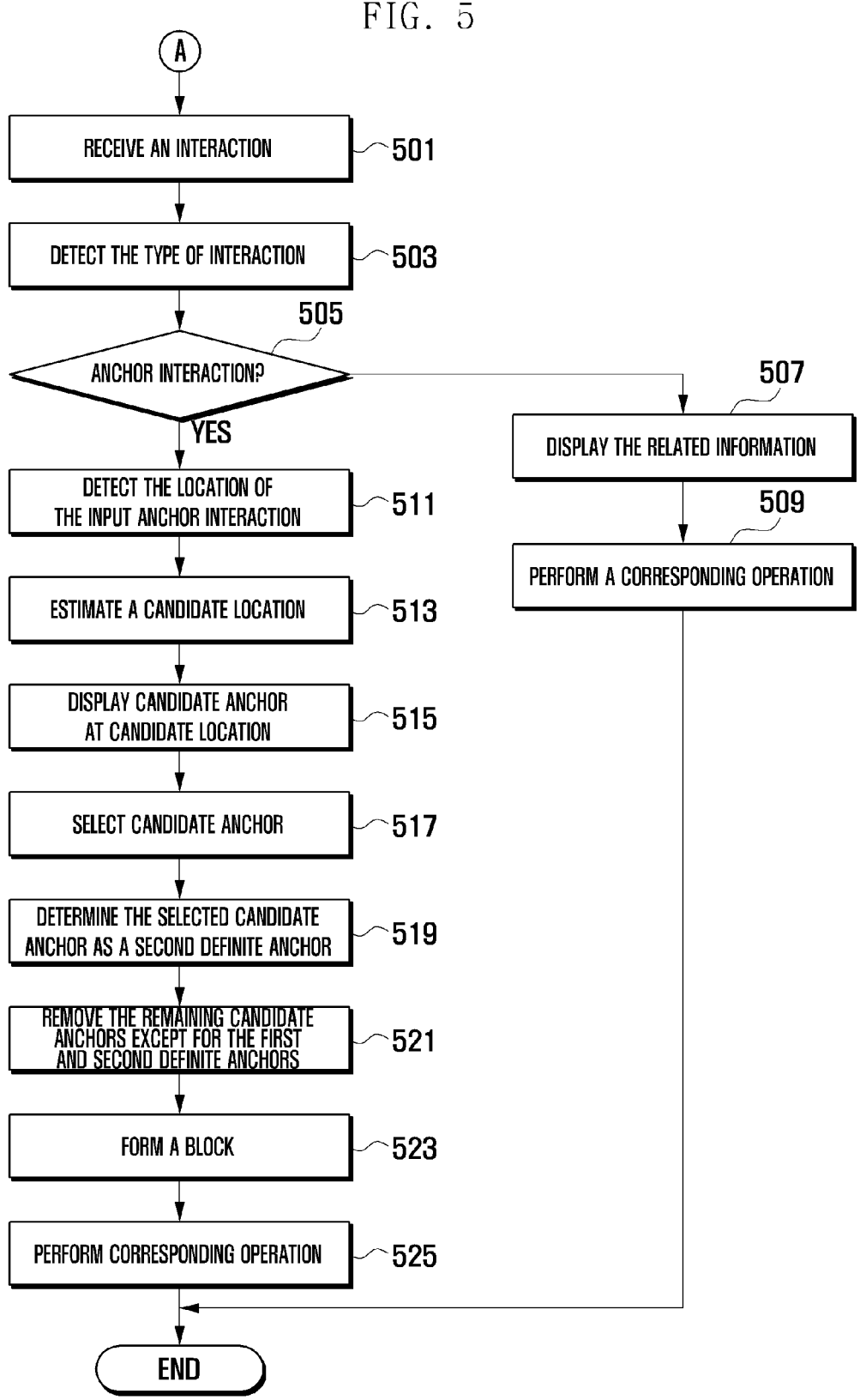

METHOD AND APPARATUS FOR OPERATING AN ELECTRONIC BOOK FUNCTION IN A MOBILE DEVICE

PRIORITY

This application claims priority under 35 U.S.C. §119(a) to Korean Patent Application No. 10-2010-0115448, which was filed in the Korean Intellectual Property Office on Nov. 19, 2010, the entire disclosure of which is incorporated herein by reference.

BACKGROUND OF THE INVENTION

1. Field of the Invention

The present invention relates generally to a system and method for providing Electronic Book (e-book) services in a mobile device, and more particularly, to a touch device that allows users to easily select text in an e-book, based on a touch interaction, and a method for operating an e-book function in the touch device.

2. Description of the Related Art

Mobile devices utilize mobile convergence to provide additional services and functionality normally provided by other types of mobile systems, in addition to traditional service functions. A mobile communication device can include basic communication functionality such as voice calling and messaging and additional functions such as TV viewing functionality (e.g., mobile broadcasting, such as Digital Multimedia Broadcasting (DMB), Digital Video Broadcasting (DVB), etc.), audio playback functionality (e.g., MPEG Audio Layer 3 (MP3)), photography functionality, Internet access capability, dictionary browsing, and the like.

Conventional mobile devices are developing to also support e-book functionality, wherein users purchase e-book content and store the content in their mobile devices. E-books generally refer to digital books including information such as text and image and are stored in electronic media, and can essentially be used as hard copy books. E-books are created from content in hard copy books or publications, converted to digital data. Users can view the content in an e-book, via a computer or a mobile device, through wired or wireless communication.

The development of tablet PCs, which have a relatively large display for easily viewing content, has encouraged the development of technology related to e-book functionality. The e-book functionality provides user convenience when displaying e-book content.

SUMMARY OF THE INVENTION

Accordingly, the present invention has been made to solve the above problems occurring in the prior art, and the present invention provides a mobile device supporting an e-book service, and a method for operating an e-book function in the mobile device.

In accordance with an aspect of the present invention, there is provided a method for operating an e-book in a mobile device, including displaying e-book content; receiving an anchor interaction at a location in text of the e-book content; displaying a number of candidate anchors, based on the location where the anchor interaction is input; determining two selected candidate anchors as definite anchors; and forming a block enclosing the text between the definite anchors.

In accordance with another aspect of the present invention, there is provided a mobile device supporting an e-book function including a display unit, a storage unit, and a controller. The display unit displays e-book content, and highlights a guide item and text selected according to the guide item, wherein the guide item guides a user to select text in the e-book content. The storage unit stores the guide item and setting information, wherein the setting information is related to a mode for displaying a block that designates text according to the guide item and a mode for estimating a candidate location according to an interaction. The controller estimates a candidate location to designate a block, based on the anchor interaction applied to the e-book content, displays candidate anchors at corresponding candidate locations, and forms a block enclosing the text between two definite anchors, wherein the two definite anchors are determined from the candidate anchors.

BRIEF DESCRIPTION OF THE DRAWINGS

The above and other aspects, features and advantages of the present invention will be more apparent from the following detailed description taken in conjunction with the accompanying drawings, in which:

FIGS. 4 and 5 are flowcharts illustrating methods for selecting a corresponding part of text in an e-book in a mobile device, according to an embodiment of the present invention.

DETAILED DESCRIPTION OF EMBODIMENTS OF THE PRESENT INVENTION

Hereinafter, various embodiments of the present invention will be described in detail with reference to the accompanying drawings. The same reference numbers are used throughout the drawings to refer to the same or similar elements. Detailed descriptions of well-known functions and structures may be omitted to avoid obscuring the subject matter of the present invention.

In the following description, a number of candidate anchors are set with respect to a location corresponding to a user's interaction during an e-book service. The present invention is directed to a method that can automatically select a part of a text between definite anchors determined from the candidate anchors, selected by a user, and a mobile device implementing the method thereof. In the following description, the term 'anchor' refers to a guide item to select a part of text in an e-book, and this is used for the sake of convenience.

The term 'candidate anchor' also refers to a guide item to select a part of text, and the number of candidate anchors is set as one or more according to a user's settings. The following embodiments will be described based on three candidate anchors. The term 'definite anchor' refers to one of a number of candidate anchors that is located in a part of text that a user wishes to select, and that is finally selected by the user. In the following embodiments, two definite anchors include a start point anchor and an end point anchor to select a part of text. It should be understood that the candidate anchors and definite anchors may be expressed in various types of images, icons, diagrams, etc., according to a user's settings. Herein, the candidate anchors and definite anchors will be illustrated as a shape of arrow icon in the following embodiments.

In the following description, the configuration and operation of a mobile device will be explained in detail in reference to the drawings. However, the present invention is not limited to the embodiments described herein, and various modifications in form and detail may be made, without departing from the spirit and scope of the present invention.

Figure 1:
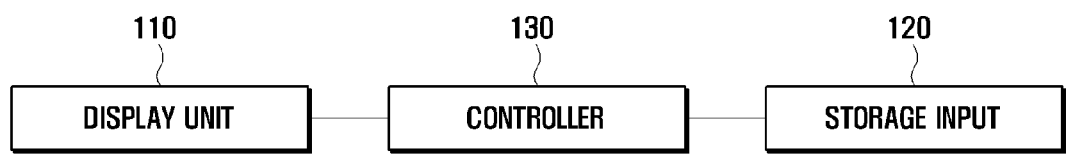
FIG. 1 is a block diagram illustrating a mobile device according to an embodiment of the present invention.

FIG. 1 illustrates a schematic block diagram of a mobile device according to an embodiment of the invention. Referring to FIG. 1, the mobile device includes a display unit 110, a storage unit 120, and a controller 130. The mobile device may additionally include an audio processing unit with a microphone and a speaker; a digital broadcast module for receiving and playing back mobile broadcasting (e.g., Digital Multimedia Broadcasting (DMB), Digital Video Broadcasting (DVB), etc.); a camera module for photographing pictures/video; a Bluetooth communication module; at least one communication module for supporting a mobile communication service and a Wireless Local Area Network (WLAN) based Internet service (e.g., Wi-Fi service); a touchpad; a key input unit; a battery; etc. Since these elements are well-known to an ordinary person skilled in the art, the detailed description is omitted in the following description.

The display unit 110 displays various types of screens when applications are executed in the mobile device as well as a home screen for the mobile device. The applications are related to various functions, for example, messages, emails, Internet, multimedia, browsing, communication, e-book, photographing, videos, playing back photographs/video, TV viewing (e.g., mobile broadcasting such as DMB, DVB, etc.), audio playback (e.g., MP3 files), widget, note, gaming, etc. The display unit 110 may be implemented with a Liquid Crystal Display (LCD), an Organic Light Emitting Diode (OLED), an Active Matrix Organic Light Emitting Diodes (AMOLED), or the like.

The display unit 110 displays a guide item (e.g., candidate anchors and definite anchors) for guiding the user to select corresponding text in an e-book during the execution of e-book function. The display unit 110 also highlights and displays corresponding text in an e-book (e.g., a part of the text enclosed in a block), selected according to the guide item. The display unit 110 can also display an execution screen (according to the execution of e-book function) in a landscape mode or portrait mode according to the rotation direction of the mobile device.

The display unit 110 may include an interface that supports a touch-based input function. For example, when the display unit 110 is implemented with a touch screen, it receives a user's touch input, creates an input signal corresponding thereto, and transfers it to the controller 130. Although the mobile device is implemented to include only one display unit, it should be understood that the invention is not limited to one display unit. The mobile device may be modified in such a manner to include two or more display units.

The storage unit 120 stores data and programs executed in the mobile device. The storage unit 120 includes at least one or more volatile memory devices and non-volatile memory devices. Examples of the non-volatile memory devices are Read Only Memory (ROM), flash memory, etc. The volatile memory device includes Random Access Memory (RAM), etc. The storage unit 120 may permanently or temporarily store an Operating System (OS) of the mobile device, data and programs related to the display control of the display unit 110, data and programs related to the input control via the display unit 110, data and programs related to the operation of an e-book function, etc. The storage unit 120 stores various types of guide items. The storage unit 120 also stores setting information regarding the modes for displaying a block that designates text according to guide items, for example, highlighting, oblique lining, underlining, etc. The storage unit 120 can also store setting information regarding how to estimate a location of a candidate according to an interaction.

The controller 130 controls the entire operation of the mobile device. The controller 130 controls the operations related to an e-book function. For example, the controller 130 can extract and display e-book content corresponding to a user's selection during the execution of e-book function. The controller 130 can detect interactions applied to e-book content. When the controller 130 detects an anchor interaction to select text, it can identify the location (coordinates) and display a preset number of candidate anchors with respect to the identified location. The controller 130 alters one of the candidate anchors according to the user's selection into a definite anchor and then displays the definite anchor.

Alternatively, when two definite anchors are set, the controller 130 can designate and highlight text between the two definite anchors, via a block. The control operation of the controller 130 will be described in detail when the operations and control method of the mobile device is explained later.

The controller 130 also controls the operations related to the usual functions of the mobile device. For example, when the controller 130 executes an application, it can control the operations and display corresponding data. The controller 130 receives input signals according to a variety of input modes that the touch-based input interface supports, and controls corresponding functions. The controller 130 controls the scrolling operation of e-book content according to a user's touch-based input during the execution of e-book function.

The mobile device illustrated in FIG. 1 can be applied to all types of devices, for example, a bar type, a folder type, a slide type, a swing type, a flip-flop type, etc. The mobile device includes all information communication devices, multimedia devices, and their applications, which are operated according to communication protocols corresponding to a variety of communication systems. For example, the mobile device can be applied to mobile communication terminals, tablet personal computers, smartphones, Portable Multimedia Players (PMPs), digital broadcast players, Personal Digital Assistants (PDAs), mobile game players, net book computers, laptop computers, etc.

Figure 2:
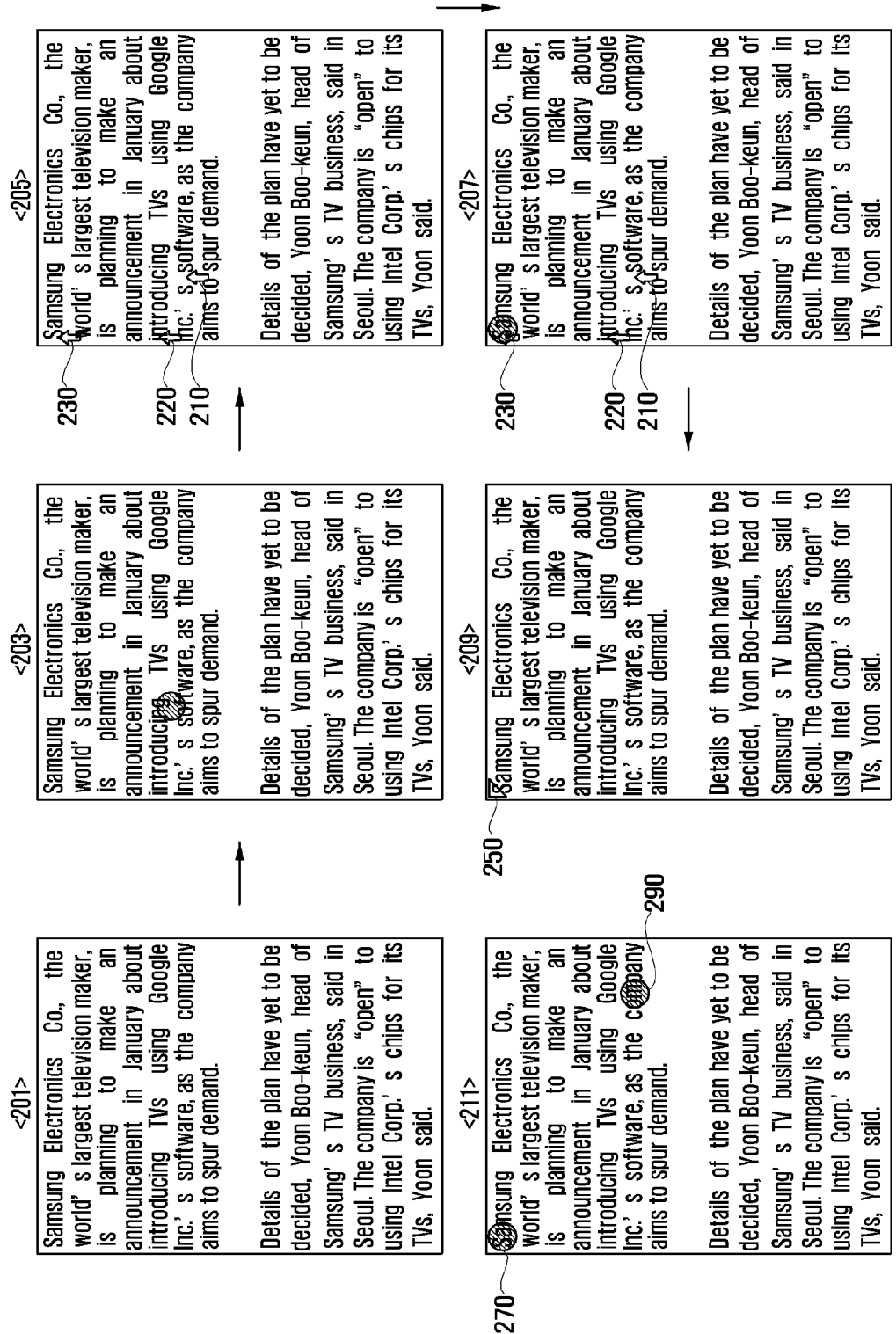
FIGS. 2 and 3 are diagrams illustrating screens for the processes of selecting a corresponding part of text in an e-book in a mobile device according to an embodiment of the present invention.
Figure 3:
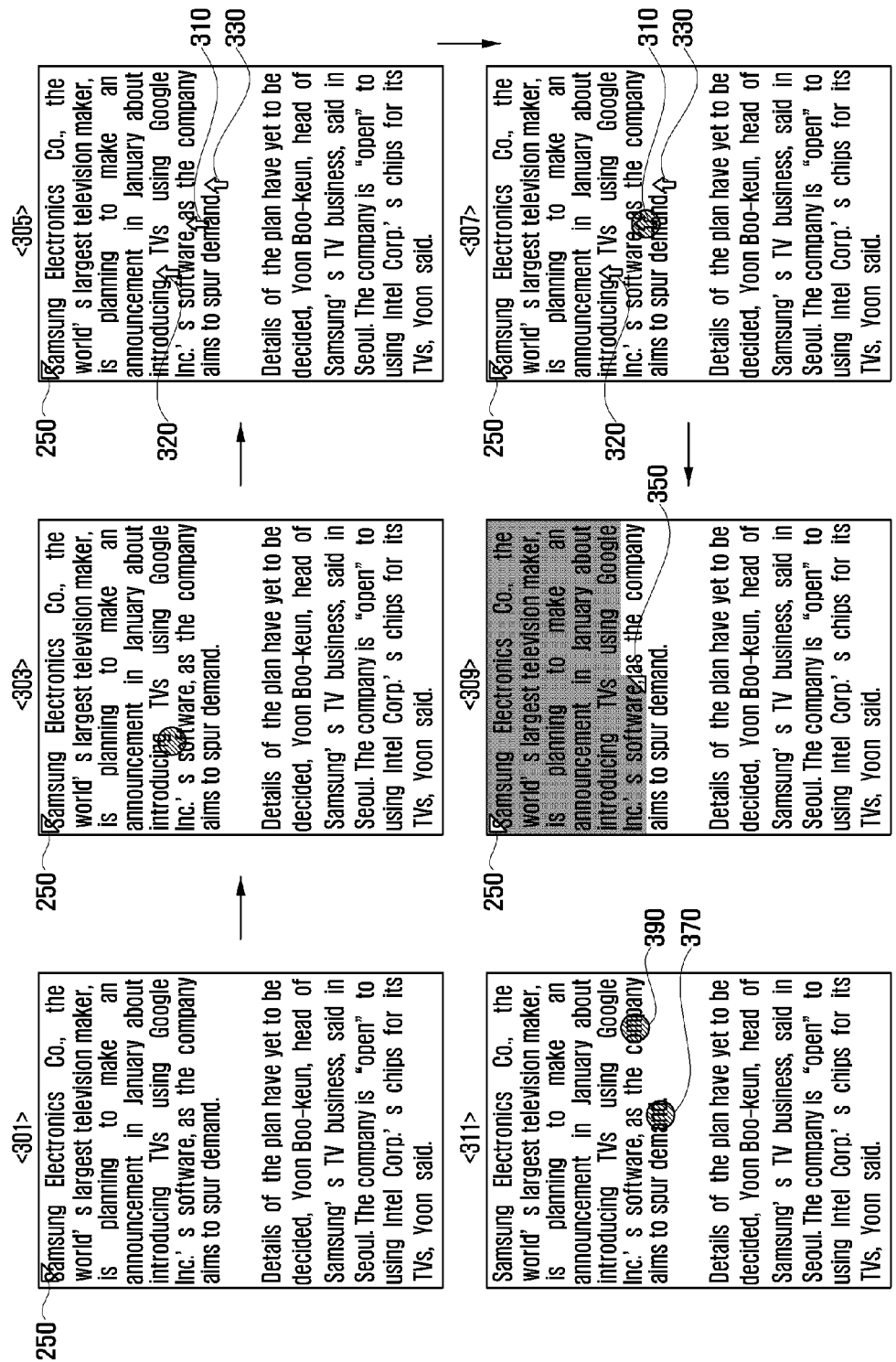

FIGS. 2 and 3 illustrate screens to describe the processes of selecting a corresponding part of text in an e-book in a mobile device according to an embodiment of the invention.

Referring to FIG. 2, an example is illustrated where a start point designates text to be selected from e-book content. As illustrated in element 201, it is assumed that the mobile device displays e-book content according to the user's selection. As illustrated in element 203, the user applies an interaction to a particular location in the e-book content and selects a particular part of text therein. The interaction may be applied to a start location of corresponding text or a location close to the start location.

For example, the term 'text' can refer to a sentence. Selecting text means designating a sentence (or paragraph) via a block. An interaction to select text is used to output a guide item, and is called an anchor interaction.

Usual interactions are input to the mobile device in a short touch mode, and anchor interactions are input to the mobile device in a long touch mode. When the mobile device receives an interaction via a short touch while displaying e-book content, it moves the cursor to a corresponding location. Likewise, when the mobile device receives an interaction via a long touch, it displays a guide item (e.g., an anchor) with respect to a corresponding location.

When an anchor interaction is applied to the mobile device as illustrated in element 203, the mobile device displays a number of guide items 210, 220 and 230 (hereinafter called candidate anchors) as illustrated in element 205. The candidate anchors refer to items indicating candidate locations, such as arrows. When the controller 130 detects the anchor interaction, it can identify a location (or coordinate) where the anchor interaction is input, and show the candidate anchors 210, 220 and 230 at the candidate locations that are likely to be selected by the user.

It is assumed that there are three candidate anchors to determine a start location of a block. The three candidate anchors 210, 220 and 230 include two start points of words and one start point of a sentence, with respect to a location (or coordinate) where the anchor interaction is input, hereinafter called a selected location. Although the description is based on three candidate anchors, as an example, any number of candidate anchors may be used, by considering estimated candidate locations.

The candidate locations of the candidate anchors 210, 220 and 230 are: a start location (a start point candidate location 1) of a word after a space, closest to the selected location (i.e., a location where the user input an anchor interaction (or a long touch); a start location (a start point candidate location 2) of a word, closest to the selected location; and a start location (a start point candidate location 3) of a sentence, closest to the selected location, respectively. As illustrated in element 205, the start point candidate location 1 corresponds to a location where an anchor 210 is displayed, the start point candidate location 2 corresponds to a location where an anchor 220 is displayed, and the start point candidate location 3 corresponds to a location where an anchor 230 is displayed. The term 'space' may refer to a horizontal space in the text, except for a vertical space.

As illustrated in element 205, the user can select a particular anchor to corresponding to a start location of text to be selected. That is, as described above, the user can select one of the candidate anchors 210, 220 and 230 displayed at corresponding candidate locations, and determine a start location of a block to select text. For example, as illustrated in element 207, the user can input an interaction (e.g., a tap) to select a candidate anchor 230.

When the candidate anchor 230 has been selected as illustrated in element 207, the controller 130 removes the remaining candidate anchors 210 and 220, except for the selected candidate anchor 230 corresponding to the start location of a block. The controller 130 may provide the selected candidate anchor 230 in the other type of item, for example, reference number 250, as illustrated in element 209, so that the user can easily identify the selected anchor. The finally selected candidate anchor 230 is called a definite anchor. The definite anchor can be provided in the same type of item as the candidate anchor, and additionally in a different color. Alternatively, the definite anchor may also be provided in a different type of item from the candidate anchor, for example, reference number 250 as illustrated in element 209.

The user can input various types of anchor interactions to select text. For example, the user can input an anchor interaction close to a start location of a block, thereby increasing the precision of input interaction. Alternatively, when a block starts at a start portion of a sentence, the user can input an anchor location to a location in the text of the sentence and easily designate the start location of the sentence, serving as the start location of a block.

A candidate anchor can vary depending on an estimated candidate location with respect to an anchor interaction. For example, when the estimated number of candidate locations is three, the mobile device displays three candidate anchors. However, when an anchor interaction is input to a start location 270 of a sentence or to a location 290 where only one word exists, the estimated number of candidate locations is one or two, as illustrated in element 211. In that case, the number of candidate anchors according to an anchor interaction is also one or two.

FIG. 3 illustrates screens designating an end point of text to be selected from e-book content, cooperating with the processes illustrated in FIG. 2.

As illustrated in element 301, it is assumed that the definite anchor 250 is determined and displayed at a start location of a block, and retains its location during the text selection, i.e., until configuring a block is terminated. As illustrated in element 303, the user inputs an anchor interaction to select a corresponding part of text in the e-book content. The anchor interaction is input to an end location of text to be selected or a location close to the end location.

When the user has input an anchor interaction as illustrated in element 303, the controller 130 displays a number of guide items 310, 320 and 330, i.e., candidate anchors, as illustrated in element 305. When the controller 130 detects the user's input anchor interaction, it identifies the location (or coordinate) and then displays the candidate anchors 310, 320 and 330 at corresponding candidate locations that the user is likely to select, with respect to the detected location.

It is assumed that the number of candidate anchors is three to determine an end location of a block. The three candidate anchors 310, 320 and 330 include two end points of words and one end point of a sentence, with respect to a location (or coordinate) where the anchor interaction is input, hereinafter called a selected location. Although the description is based on three candidate anchors, as an example, any number of candidate anchors may be used, by considering estimated candidate locations.

The candidate locations of the candidate anchors 310, 320 and 330 are: an end location (an end point candidate location 1) of a word before a space, closest to the selected location (i.e., a location where the user input an anchor interaction (or a long touch)); an end location (an end point candidate location 2) of a word, closest to the selected location; and an end location (an end point candidate location 3) of a sentence, closest to the selected location, respectively. As illustrated in element 305, the end point candidate location 1 corresponds to a location where an anchor 310 is displayed, the end point candidate location 2 corresponds to a location where an anchor 320 is displayed, and the end point candidate location 3 corresponds to a location where an anchor 330 is displayed. The term 'space' may refer to a horizontal space in the text, except for a vertical space.

As illustrated in element 305, the user can select a particular anchor corresponding to an end location of text to be selected. That is, as described above, the user can select one of the candidate anchors 310, 320 and 330 displayed at corresponding candidate locations, and determines an end location of a block to select text. For example, as illustrated in element 307, the user can input an interaction (e.g., a tap) to select a candidate anchor 310.

When the candidate anchor 310 has been selected as illustrated in element 307, the controller 130 removes the remaining candidate anchors 320 and 330, except for the selected candidate anchor 310 corresponding to the end location of a block. The controller 130 may provide the selected candidate anchor 310 in the other type of item, for example, reference number 350, as illustrated in element 309, so that the user can easily identify the selected anchor. The finally selected candidate anchor 310 is called a definite anchor. The definite anchor can be provided in the same type of item as the candidate anchor, and additionally in a different color. Alternatively, the definite anchor may also be provided in a different type of item from the candidate anchor, for example, reference number 350 as illustrated in element 309.

As illustrated in element 309, when the start location of a block to select text (e.g., a location of a definite anchor (a first definite anchor 250)) and the end location (e.g., a location of a definite anchor (a second definite anchor) 350) are all determined, the controller 130 designates text between the first 250 and second 350 definite anchors in a block and highlights it.

The user can input various types of anchor interactions to select text. For example, the user can input an anchor interaction close to an end location of a block, thereby increasing the precision of input interaction. Alternatively, when a block ends at an end portion of a sentence, the user can input an anchor location to a location in the text of the sentence and easily designate the end location of the sentence via the end location of the block.

A candidate anchor can vary depending on an estimated candidate location with respect to an anchor interaction. For example, when the estimated number of candidate locations is three, the mobile device displays three candidate anchors. On the contrary, as illustrated in element 311, when an anchor interaction is input to an end location 370 of a sentence or to a location 390 where only one word exists, the estimated number of candidate locations is one or two. In that case, the number of candidate anchors according to an anchor interaction is also one or two.

Figure 4:
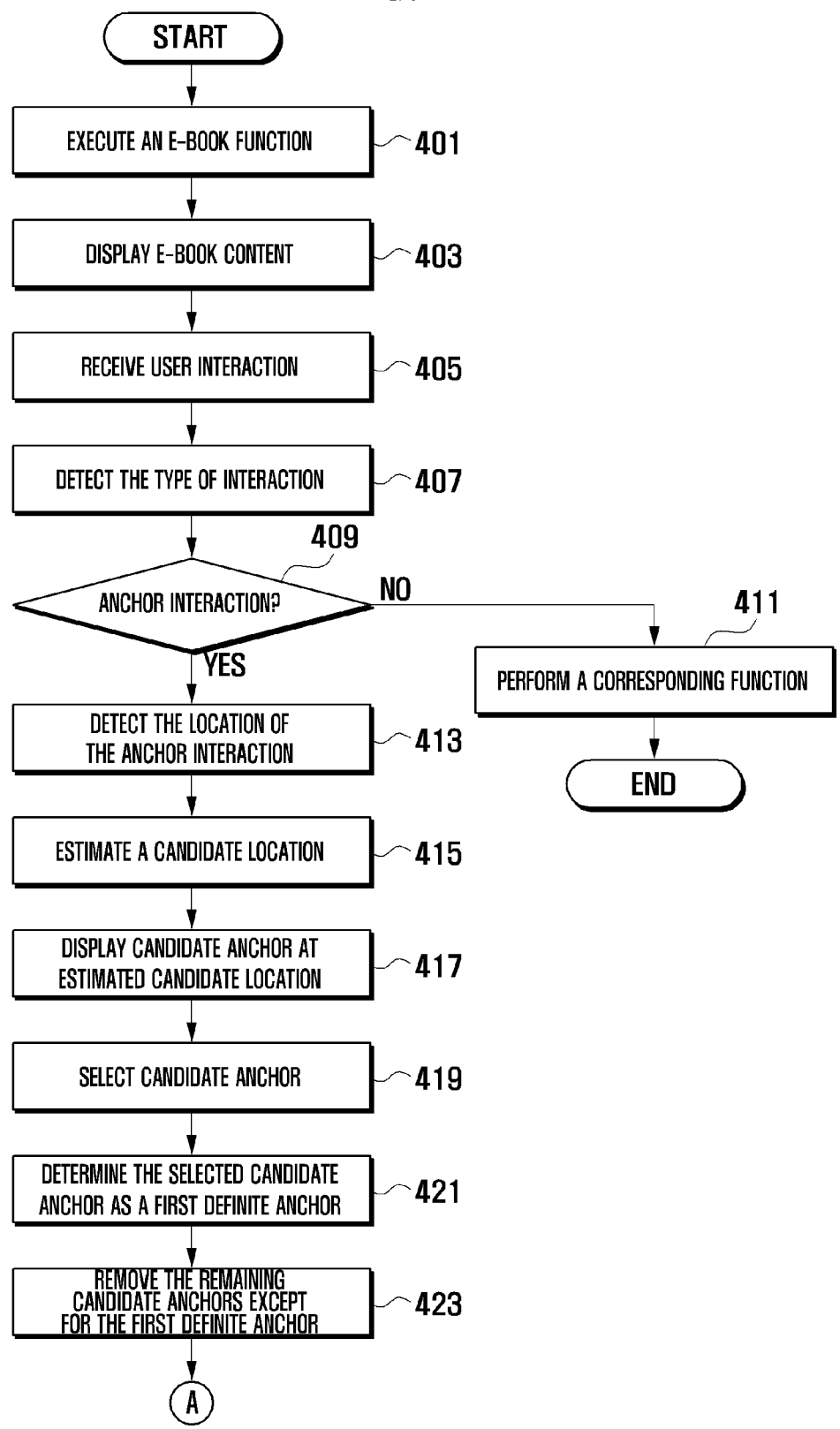

FIGS. 4 and 5 are flowcharts illustrating a method for selecting a corresponding part of text in an e-book in a mobile device according to an embodiment of the invention. In particular, the steps of the flowchart illustrated in FIG. 4 describe a process for selecting a start point of text in e-book content, and the steps illustrated in FIG. 5 describe a process for selecting an end point of text in the e-book content.

Referring to FIGS. 4 and 5, the controller 130 executes an e-book function in a mobile device according to the user's request in step 401, and then displays e-book content according to a user's selection in step 403.

When the controller 130 receives a user's interaction in step 405, it detects the type of interaction in step 407. The controller 130 determines whether it is an anchor interaction in step 409.

When the controller 130 ascertains that the detected interaction is not an anchor interaction in step 409, it performs a function corresponding to the detected interaction in step 411. For example, the controller 130 may scroll the e-book content on the screen according to the user's interaction.

However, when the controller 130 ascertains that the detected interaction is an anchor interaction in step 409, it detects the location of the anchor interaction in step 413. For example, the controller 130 may extract a coordinate corresponding to the location where the anchor interaction is input.

In step 415, the controller 130 estimates a candidate location based on the location of the anchor interaction. For example, when the user applies a long touch to a location in the e-book content, the controller 130 can estimate one or more candidate locations that the user is likely to select, based on the location where the long touch is input. In that case, the controller 130 estimates the candidate locations, by considering: a start location of a word after a space closest to the selected location, a start location of a word closest to the selected location; and a start location of a sentence closest to the selected location.

The controller 130 controls the display of at least one candidate anchor at an estimated candidate location in step 417. For example, as illustrated in diagram 205 of FIG. 2, the controller 130 displays three candidate anchors 210, 220 and 230.

When the user selects one of the candidate anchors 210, 220 and 230 in step 419, the controller 130 determines the selected candidate anchor as a first definite anchor in step 421. In step 423, the controller 130 removes the remaining candidate anchors except for the first definite anchor. For example, as illustrated in diagram 207 of FIG. 2, when the user selects a candidate anchor 230, the controller 130 determines it as a first definite anchor. After that, as illustrated in diagram 209 of FIG. 2, the controller 130 alters the type of the selected candidate anchor 230 to another type of item, set as a first definite anchor 250, and then displays it. The first definite anchor may be displayed in the same type as the candidate anchor 230, according to a user's setting. After that, the controller 130 removes the other candidate anchors 210 and 220 except for the definite anchor 250.

Referring to FIG. 5, when the controller 130 determines the start location of a block to select text, according to the definite anchor 250, and receives a user's interaction in step 501, it detects the type of interaction in step 503. The controller 130 determines whether it is an anchor interaction in step 505.

When the controller 130 ascertains that the detected interaction is not an anchor interaction in step 505, it displays the related information in step 507 and performs a corresponding operation in step 509. For example, the controller 130 may display a pop-up message stating that the interaction is not correctly input and then waits for the input of an interaction. The controller 130 terminates the process of setting a block to select text, which was previously performed according to an interaction, and displays only the initial e-book content.

However, when the controller 130 ascertains that the detected interaction is an anchor interaction in step 505, it detects the location of the input anchor interaction in step 511. To do this, the controller 130 extracts a coordinate corresponding to the location where the anchor interaction is input.

The controller 130 estimates a candidate location based on the location of the anchor interaction in step 513. For example, when the user applies a long touch to a location in the e-book content, the controller 130 can estimate one or more candidate locations that the user is likely to select, based on the location where the long touch is input. In that case, the controller 130 estimates the candidate locations, by considering: an end location of a word before a space closest to the selected location; an end location of a word closest to the selected location; and an end location of a sentence closest to the selected location.

The controller 130 controls the display of at least one candidate anchor at an estimated candidate location in step 515. For example, as illustrated in diagram 305 of FIG. 3, the controller 130 displays the first definite anchor 250 and three candidate anchors 310, 320 and 330.

When the user selects one of the candidate anchors 310, 320 and 330 in step 517, the controller 130 determines the selected candidate anchor as a second definite anchor in step 519. In step 521, the controller 130 removes the remaining candidate anchors except for the first definite anchor 250 and the second definite anchor. For example, as illustrated in diagram 307 of FIG. 3, when the user selects a candidate anchor 310, the controller 130 determines it as a second definite anchor. After that, as illustrated in diagram 309 of FIG. 3, the controller 130 alters the type of the selected candidate anchor 310 to another type of item set as a second definite anchor 350, and then displays it. The second definite anchor may be displayed in the same type as the candidate anchor 310, according to a user's setting. After that, the controller 130 removes the other candidate anchors 320 and 330 except for the first definite anchor 250 and the second definite anchor.

In step 523, the controller 130 forms a block of text between the first definite anchor 250 and the second definite anchor 350. For example, as illustrated in diagram 309 of FIG. 3, when the start location of a block to select text (first definite anchor 250) and the end location of the block (second definite anchor 35) are determined, the controller 130 highlights the text between the first definite anchor 250 and the second definite anchor 350.

After forming the block via the first definite anchor 250 and the second definite anchor 350 in step 523, the controller 130 performs a corresponding operation according to a user's request in step 525. For example, when the user applies a drag interaction using the first definite anchor 250 or the second definite anchor 350, the controller 130 can alter the size of the block according to the user's drag interaction. The controller 130 detects a user's long touch interaction applied to a location in the block, and creates a menu and then performs various operations using a block (e.g., copying and pasting, e-mailing, cutting and pasting, etc.).

As described above, the method and apparatus for operating an e-book function can enhance the quality of an e-book service in a mobile device by adding new functions to the e-book function. The method and apparatus can load guide information for allowing a user to move a cursor or select text according to types of user input interaction while the user is enjoying an e-book service, thereby allowing the user to correctly select or designate a corresponding part of text in the e-book. The method and apparatus can allow a user to easily and correctly select a corresponding part of text in an e-book in an environment where the mobile device severely sways while the user is moving. The method and apparatus can provide an optimal environment to select a corresponding part of text in an e-book of a mobile device, thereby enhancing the use convenience and the competitiveness of the mobile device.

As described above, the e-book function operating method can be implemented with program commands that can be conducted via various types of computers and recorded in computer-readable recording media. The computer-readable recording media contain program commands, data files, data structures, or the like, or a combination thereof. The program commands recorded in the recording media may be designed or configured to comply with the invention or may be software well-known to the ordinary person skilled in the art.

The computer-readable recoding media includes hardware systems for storing and conducting program commands, for example magnetic media such as a hard disk, floppy disk, magnetic tape, optical media such as CD-ROM and DVD, Magneto-Optical Media, such as floptical disk, ROM, RAM, flash memory, etc. The program commands include assembly language or machine code complied by a complier and a high-level language. The hardware systems may be implemented with at least one software module according to the present invention.

Although various embodiments of the invention have been described in detail herein, many variations and modifications may be made, as apparent to those skilled in the art without departing from the spirit and scope of the present invention as defined by the appended claims.

What is claimed is:

1. A method for operating an Electronic Book (e-book) in a mobile device, the method comprising:
    displaying e-book content;
    receiving a first anchor interaction at a first location corresponding to a start location of corresponding text or a location close to the start location in text of the e-book content;
    displaying a first plurality of candidate anchors at a plurality of candidate locations between first text items of the e-book content based on the first location;
    determining a first candidate anchor from the first plurality of candidate anchors to be a first definite anchor, when the first candidate anchor is selected;
    removing remaining candidate anchors of the first plurality of candidate anchors, except the first candidate anchor for a start location of a block;
    receiving a second anchor interaction at a second location corresponding to a start location of corresponding text or a location close to the start location in the text of the e-book content;
    displaying a second plurality of candidate anchors at a plurality of candidate locations between second text items of the e-book content based on the second location;
    determining a second candidate anchor from the second plurality of candidate anchors to be a second definite anchor, when the second candidate anchor is selected;
    removing remaining candidate anchors of the second plurality of candidate anchors, except the second candidate anchor for an end location of the block; and
    forming a block enclosing text between the first definite anchor and the second definite anchor.

2. The method of claim 1, further comprising:
    estimating a start point candidate location as the start location of the block, based on the first location where the first anchor interaction is input; and
    displaying one of the first plurality of candidate anchors at the start point candidate location.

3. The method of claim 2, wherein determining the first candidate anchor to be the first definite anchor comprises:
    determining the one of the first plurality of candidate anchors, corresponding to the start point candidate location, as the first definite anchor serving as the start point of the block.

4. The method of claim 1, further comprising:
    estimating an end point candidate location as the end location of the block, based on the second location where the second anchor interaction is input; and
    displaying one of the second plurality of candidate anchors at the estimated end point candidate location.

5. The method of claim 4, wherein determining the second candidate anchor to be the second definite anchor comprises:
    determining the one of the second plurality of candidate anchors, corresponding to the end point candidate location, as the second definite anchor.

6. The method of claim 1, wherein forming the block comprises:
    highlighting the text between the first definite anchor and the second definite anchor.

7. The method of claim 4, wherein displaying the one of the second plurality of candidate anchors at the end point candidate location comprises:
    displaying the one of the second plurality of candidate anchors at the end point location while the first definite anchor is displayed.

8. The method of claim 2, wherein estimating the start point candidate location comprises:
    estimating a start location of a word after a space closest to the selected location where the first anchor interaction is input, a start location of a word closest to the selected location, and a start location of a sentence closest to the selected location.

9. The method of claim 4, wherein estimating the end point candidate location comprises:

estimating an end location of a word before a space closest to the selected location where the second anchor interaction is input, an end location of a word closest to the selected location, and an end location of a sentence closest to the selected location.

10. The method of claim 1, further comprising:
altering a size of the block formed by using at least one of the first definite anchor and the second definite anchor.

11. A mobile device supporting an Electronic Book (e-book) function, the mobile device comprising:
   a display unit for displaying e-book content, and highlighting guide items and text selected from the e-book content according to the guide items, wherein the guide items guide a user to select the text in the e-book content;
   a storage unit for storing the guide items and setting information, wherein the setting information is related to a mode for displaying a block that designates the text according to the guide items and a mode for estimating candidate locations according to anchor interactions and
   a controller for estimating the candidate locations to designate a block, based on the anchor interactions applied to the e-book content, displaying a first plurality of candidate anchors at corresponding candidate locations between first text items of the e-book content based on a first location where a first anchor interaction is input, determining a first candidate anchor from the first plurality of candidate anchors to be a first definite anchor when the first candidate anchor is selected, removing remaining candidate anchors of the first plurality of candidate anchors, except the first candidate anchor for a start location of a block, displaying a second plurality of candidate anchors at corresponding candidate locations between second text items of the e-book content based on a second location where a second anchor interaction is input, determining a second candidate anchor from the second plurality of candidate anchors to be a second definite anchor when the second candidate anchor is selected, removing remaining candidate anchors of the second plurality of candidate anchors, except the second candidate anchor for an end location of the block, and forming the block enclosing the text between the first definite anchor and the second definite anchor,
   wherein the first and second anchor interactions are input at locations corresponding to a start location of corresponding text or a location close to the start location.

12. The mobile device of claim 11, wherein the controller estimates a start point candidate location as the start location of the block, based on the first location where the first anchor interaction is input; provides one of the first plurality of candidate anchors for guiding a start location of the block to a corresponding start point candidate location; determines the one of the first plurality of candidate anchors as the first definite anchor for the block start; estimates an end point candidate location as the end location of the block, based on the second location where the second anchor interaction is input after determining the first definite anchor; provides one of the second plurality of candidate anchors for guiding an end location of the block to a corresponding end point candidate location; and determines the one of the plurality of candidate anchors as the second definite anchor for the block end.

13. The mobile device of claim 11, wherein the controller estimates a start location of a word after a space closest to the selected location where the first anchor interaction is input, a start location of a word closest to the selected location, and a start location of a sentence closest to the selected location; and estimates an end location of a word before a space closest to the selected location where the second anchor interaction is input, an end location of a word closest to the selected location, and an end location of a sentence closest to the selected location.

14. The method of claim 1, further comprising:
displaying the first or second plurality of candidate anchors based on two start points of words and one start point of a sentence, with respect to a location where the first or second anchor interaction is input.

15. The mobile device of claim 11, wherein the controller displays the first or second plurality of candidate anchors based on two start points of words and one start point of a sentence with respect to a location where the first or second anchor interaction is input.

* * * * *